(12) United States Patent
Takai

(10) Patent No.: US 6,382,237 B1
(45) Date of Patent: May 7, 2002

(54) WIDE AREA WATER COLLECTION TYPE UNDERGROUND WATER TANK

(75) Inventor: Seiichiro Takai, Tokyo (JP)

(73) Assignee: Totetu Mfg. Co. Ltd., Tokyo (JP)

( * ) Notice: Subject to any disclaimer, the term of this patent is extended or adjusted under 35 U.S.C. 154(b) by 0 days.

(21) Appl. No.: 09/830,549

(22) PCT Filed: Oct. 22, 1999

(86) PCT No.: PCT/JP99/05829

§ 371 Date: Apr. 26, 2001

§ 102(e) Date: Apr. 26, 2001

(87) PCT Pub. No.: WO00/24974

PCT Pub. Date: May 4, 2000

(30) Foreign Application Priority Data

Oct. 26, 1998 (JP) ............................................. 10-303519
Nov. 20, 1998 (JP) ............................................. 10-330561

(51) Int. Cl.[7] .............................. E03B 11/14; E03B 3/06
(52) U.S. Cl. .................................. 137/236.1; 220/567.1; 405/53
(58) Field of Search ....................... 137/236.1; 405/53; 220/567.1

(56) References Cited

U.S. PATENT DOCUMENTS 4,934,404 A * 6/1990 DeStefano ........... 137/236.1 X
5,234,286 A * 8/1993 Wagner ....................... 405/53

FOREIGN PATENT DOCUMENTS

JP 52-31231 3/1977
JP 59-80574 5/1984

* cited by examiner

Primary Examiner—Kevin Lee
(74) Attorney, Agent, or Firm—Reed Smith LLP

(57) ABSTRACT

A wide area water collection type underground water tank compresses: a water tank (11) constituted to be capable of reserving water therein, the water tank (11) being buried underground and having draining structure (14) capable of drawing out the water within the water tank (11) from the aboveground position; an intake pipe (21) having one end communicated with the interior of the water tank (11) from the side portion or upper portion of the water tank (11), and the other end opened into the underground around the water tank (11); a check valve (31) mounted to the intake pipe (21). A water impermeable sheet (19) is buried underground and upwardly and outwardly inclined from the side or bottom of the water tank.

18 Claims, 12 Drawing Sheets

42a  42a  42a          42b  42b

WIDE AREA WATER COLLECTION TYPE UNDERGROUND WATER TANK

CROSS-REFERENCES TO RELATED APPLICATIONS

This application claims the priority of Japanese Application Nos. Hei 10-303519 filed Oct. 26, 1998, Hei 10-330561 filed Nov. 20, 1998 and International Application No. PCT/JP99/05829 filed Oct. 22, 1999, the complete disclosure of which are hereby incorporated by reference.

TECHNICAL FIELD

The present invention relates to an underground water tank for reserving rainwater having fallen onto a roof or rooftop of a house or onto a ground surface. More particularly, the present invention relates to a wide area water collection type underground water tank adapted to collect and reserve rainwater infiltrating into a relatively wide area and filtered thereby.

BACKGROUND ART

It has been conventionally known to bury a water tank underground and to reserve rainwater in the water tank, so as to effectively utilize the rainwater. In such a water tank, rainwater having fallen onto a roof or rooftop of a house or onto a ground surface is reserved in the water tank by collecting and guiding the rainwater by an eaves trough or gutter into the water tank. Further, such a water tank is provided with draining means such as a pump at an aboveground position for drawing out the water reserved within the water tank, so that the water reserved within the water tank is drawn out therefrom for use.

In the aforementioned underground water tank, however, since rainwater is collected by an eaves trough or gutter, the collected water itself is contaminated with impurities such as dust and dirt, thereby problematically restricting the usage of the reserved water and causing contamination of the interior of the water tank such as by the dust and dirt. Particularly, the reserving tank buried underground problematically leads to difficulty in cleaning the once contaminated reserving tank and causes an increased burden of management of the reserving tank. Further, building a plurality of houses or factories on the ground surface under which the reserving tank has been buried will complicate: the provision of routes of an eaves trough or gutter for guiding rainwater to the water tank; and the collection of rainwater having fallen over a relatively wide area.

It is therefore a first object of the present invention to provide a wide area water collection type underground water tank capable of effectively collecting rainwater having fallen over a wide area and of reserving the collected rainwater.

It is a second object of the present invention to provide a wide area water collection type underground water tank capable of reserving relatively clean infiltrating/filtered rainwater, to thereby reduce the burden of management of the water tank itself.

It is a third object of the present invention to provide a wide area water collection type underground water tank capable of preventing an occurrence of a flood, by preventing the underground from being saturated by the rainwater infiltrating thereinto, even upon a relatively much amount of rainfall.

DISCLOSURE OF THE INVENTION

As shown in FIG. 1, the invention according to claim 1 is a wide area water collection type underground water tank comprising: a water tank 11 constituted to be capable of reserving water therein, the water tank 11 being buried underground and having draining means 14 capable of drawing out the water within the water tank 11 from the aboveground position; one or two or more intake pipe 21 having one end communicated with the interior of the water tank 11 from the side portion or upper portion of the water tank 11, and the other end opened into the underground around the water tank 11; a check valve 31 mounted to the intake pipe 21, the check valve 31 being constituted to: allow water to flow from the other end of the intake pipe 21 toward the one end of the intake pipe 21 when the water pressure at the other end side of the intake pipe 21 is equal to or higher than that at the one end side of the intake pipe 21; and inhibit water from flowing from the one end of the intake pipe 21 toward the other end of the intake pipe 21 when the water pressure at the other end side of the intake pipe 21 is lower than that at the one end side of the intake pipe 21; and a water impermeable sheet 19 buried underground and being upwardly and outwardly inclined from the side or bottom of the water tank 11; wherein the other end of the intake pipe 21 is arranged near and above the water impermeable sheet 19.

According to the invention of claim 1, rainwater having fallen onto the ground surface infiltrates into the underground. The rainwater infiltrated into the underground is purified by the natural filtering effect by the ground, and the buried water impermeable sheet 19 guides the infiltrated rainwater down to the water tank 11 by the inclination of the water impermeable sheet 19. The thus guided water flows from the other end of the intake pipe 21 arranged near and above the water impermeable sheet 19, toward the one end side of the intake pipe 21 to thereby flow into the water tank 11. The water pressure at the other end side of the intake pipe 21 is equal to or higher than that at the one end side of the intake pipe 21 when no water is reserved within the water tank 11, so that the check valve 31 allows water to flow from the other end of the intake pipe 21 to the one end of the intake pipe 21. In this way, rainwater having fallen over a relatively wide area is filtered by the ground, and then collected by the water impermeable sheet 19 and reserved in the water tank 11.

Water is inhibited from flowing from the one end of the intake pipe 21 to the other end of the intake pipe 21, when the water tank 11 is filled up with rainwater so that the water pressure at the other end side of the intake pipe 21 becomes lower than that at the one end side of the intake pipe 21. Thus, the rainwater once reserved within the water tank 11 never leaks out via intake pipe 21, so that the rainwater is effectively reserved within the water tank 11. The water within the water tank 11 is drawn out therefrom, as required, by the draining means 14.

As shown in FIG. 14, the invention of claim 2 is a wide area water collection type underground water tank comprising: a water tank 11 constituted to be capable of reserving water therein, the water tank 11 being buried underground and having draining means 14 capable of drawing out the water within the water tank 11 from the aboveground position; one or two or more intake pipe 21 having one end communicated with the interior of the water tank 11 from the side portion or upper portion of the water tank 11, and the other end opened into the underground around the water tank 11; a check valve 31 mounted to the intake pipe 21, the check valve 31 being constituted to: allow water to flow from the other end of the intake pipe 21 toward the one end of the intake pipe 21 when the water pressure at the other end side of the intake pipe 21 is equal to or higher than that at the one end side of the intake pipe 21; and inhibit water from flowing from the one end of the intake pipe 21 toward the other end of the intake pipe 21 when the water pressure at the other end side of the intake pipe 21 is lower than that at the one end side of the intake pipe 21; and forcible check valve opening means 70 for controlling the check valve 31 so as to allow water to flow from the one end of the intake pipe 21 toward the other end of the intake pipe 21 even when the water pressure at the other end side of the intake pipe 21 is lower than that at the one end side of the intake pipe 21.

According to the invention of claim 2, the water tank 11 reserves water having infiltrated into the underground upon rainfall. Further, the check valve 31 is controlled by the forcible check valve opening means 70, when the water pressure at the other end side of the intake pipe 21 becomes lower than that of the one end side of the intake pipe 21 since the water existing within the ground around the water tank 11 evaporates or infiltrates into the deeper underground upon subsequent fine weather. Controlling the check valve 31 allows water to flow from the one end of the intake pipe 21 toward the other end of the intake pipe 21, and the reserved water flows from the one end of the intake pipe 21 toward the other end of the intake pipe 21 and leaks out from the water through-holes 42a of the perforated pipe 42 into the ground around the water tank 11. In this way, there is again formed a space within the water tank 11 for reserving rainwater. Thus, by controlling the check valve 31, it becomes possible to constantly prepare a space capable of temporarily reserving a constant amount of rainwater infiltrating into the underground upon rainfall.

As shown in FIG. 14 and FIG. 15, the invention of claim 3 is based on the invention of claim 2 and is a wide area water collection type underground water tank, wherein the forcible check valve opening means 70 comprises: a float driving rod 71 provided vertically to reach a float 35 of the check valve 31 from the aboveground position; and an operation handle 72 arranged at the aboveground position and provided at the upper end of the float driving rod 71.

According to the invention of claim 3, it is possible to allow water to flow from the one end of the intake pipe 21 toward the other end of the intake pipe 21, by controlling the check valve 31 with a relatively simple operation only to vertically move the float driving rod 71 by rotating the operation handle 72.

As shown in FIG. 1 and FIG. 5, the invention of claim 4 is based on the invention of anyone of claims 1 through 3, and is a wide area water collection type underground water tank further comprising: a perforated pipe 42 buried underground and formed with a plurality of water through-holes 42a at the periphery of the perforated pipe 42, wherein the perforated pipe 42 includes: one end connected to the other end of the intake pipe 21; and the other end buried in the underground at a level higher than the other end of the intake pipe 21.

According to the invention of claim 4, rainwater having infiltrated to the vicinity of the perforated pipe 42 is guided into the perforated pipe 42 via water through-holes 42a, and the rainwater guided into the perforated pipe 42 is guided by the perforated pipe 42 to the other end of the intake pipe 21. The water tank 11 reserves rainwater having fallen over a relatively wide area and collected by the perforated pipe 42.

The invention of claim 5 is based on the invention of claim 4 and is a wide area water collection type underground water tank wherein a gravel stratum 43 is provided around the perforated pipe 42.

According to the invention of claim 5, the gravel stratum 43 prevents clogging of the water through-holes 42a of the perforated pipe 42 due to soil and sand.

The invention according to claim 6 is based on the invention of anyone of claims 1 through 5, and is a wide area water collection type underground water tank further comprising a mounting member 41 buried near the water tank 11, wherein the check valve 31 is fixed to the mounting member 41.

According to the invention of claim 6, the mounting of the check valve 31 having directivity can be assuredly conducted by fixing the check valve 31 to the mounting member 41, to thereby prevent an inclination of the check valve 31 upon burying the same.

BEST MODE FOR CARRYING OUT OF THE INVENTION

There will be described hereinafter the embodiments according the present invention, with reference to the accompanying drawings.

Figure 1:
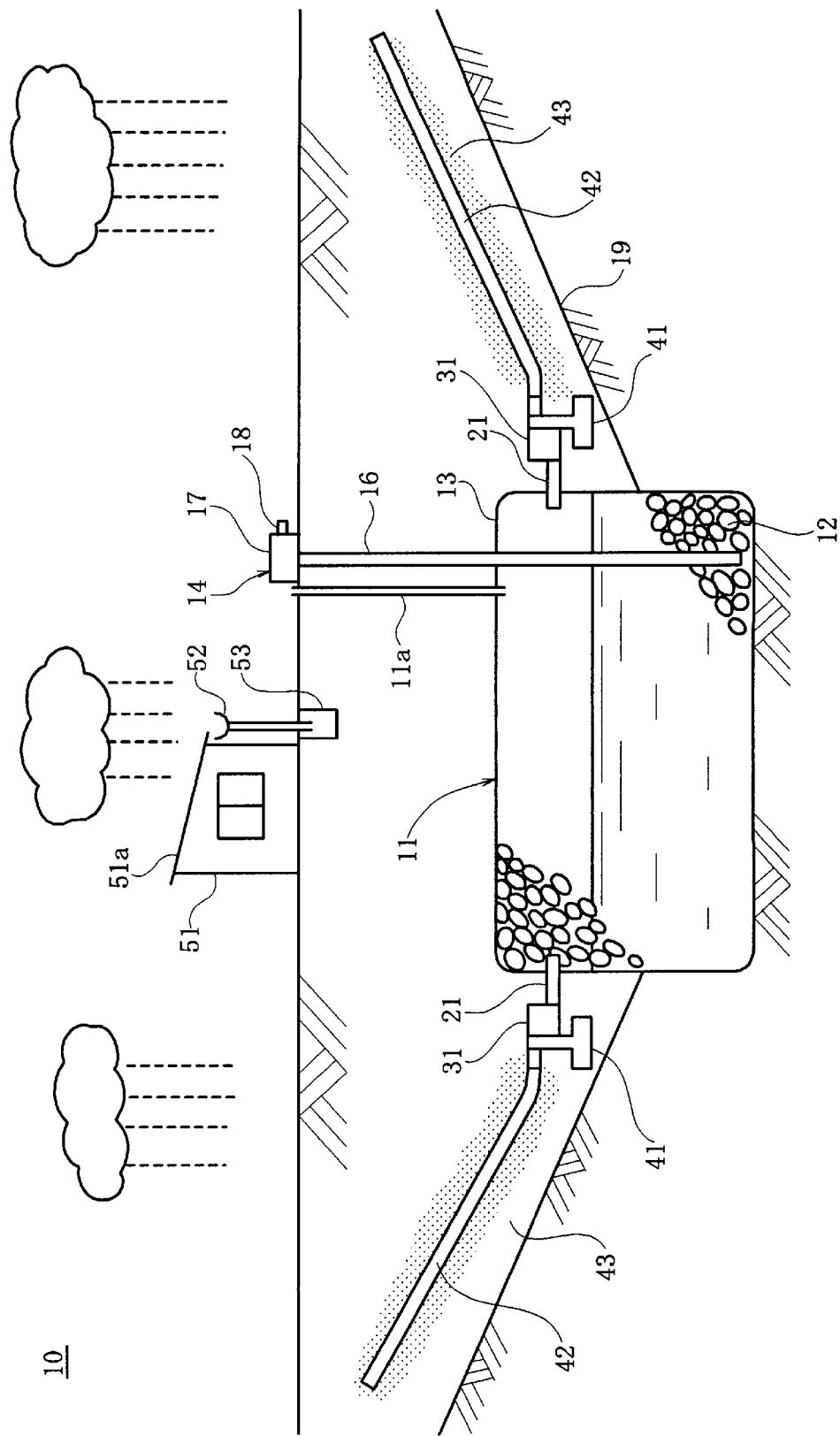
FIG. 1 a schematic cross-sectional view of a wide area water collection type underground water tank according to the present invention.

As shown in FIG. 1, the wide area water collection type underground water tank 10 of the present invention is provided with an underground buried water tank 11, a plurality of intake pipes 21, and a plurality of check valves 31. In this embodiment, the water tank 11 is buried in a ground such as sandy soil into which rainwater is relatively apt to infiltrate. The water tank 11 is formed by enclosing aquiferous materials 12 comprising sands, gravels, ragstones or plastic shaped bodies, by a waterproof sheet 13, and is provided with a vent pipe 1a and an overflow pipe (not shown). This water tank 11 is constituted to reserve water in gaps between aquiferous materials 12. The vent pipe 11a is constituted to flow the internal air within the water tank 11 to the exterior on the ground upon inflow of water from intake pipes 21, and to flow air in the exterior on the ground into the water tank 11 upon drainage of water from the water tank 11 by draining means 14 to be described later. Overflow pipes (not shown) are constituted to conduct the redundant water in the water tank 11 from the upper portion of the water tank 11 to the exterior on the ground or to another water tank (not shown), upon inflow of water exceeding the internal volume of the water tank 11.

The water tank 11 is further provided with the draining means 14 capable of drawing out the water within the water tank 11, from the exterior. This draining means 14 is constituted of: a drain pipe 16 having an upper end exposed to the ground surface and a lower end penetrating the waterproof sheet 13 down to the bottom portion of the water tank 11; and a drain pump 17 provided at the aboveground position and capable of drawing the water within the water tank 11 from the upper end of the drain pipe 16. This draining means 14 is constituted to be capable of drawing out the water within the water tank 11 from the exterior, by drawing the water within the water tank 11 by the drain pump 17 via drain pipe 16 and discharging the water from an outlet pipe 18. Buried underground together with the water tank 11 is a water impermeable sheet 19 upwardly and outwardly inclined from the middle of the side of the water tank 11.

Figure 3:
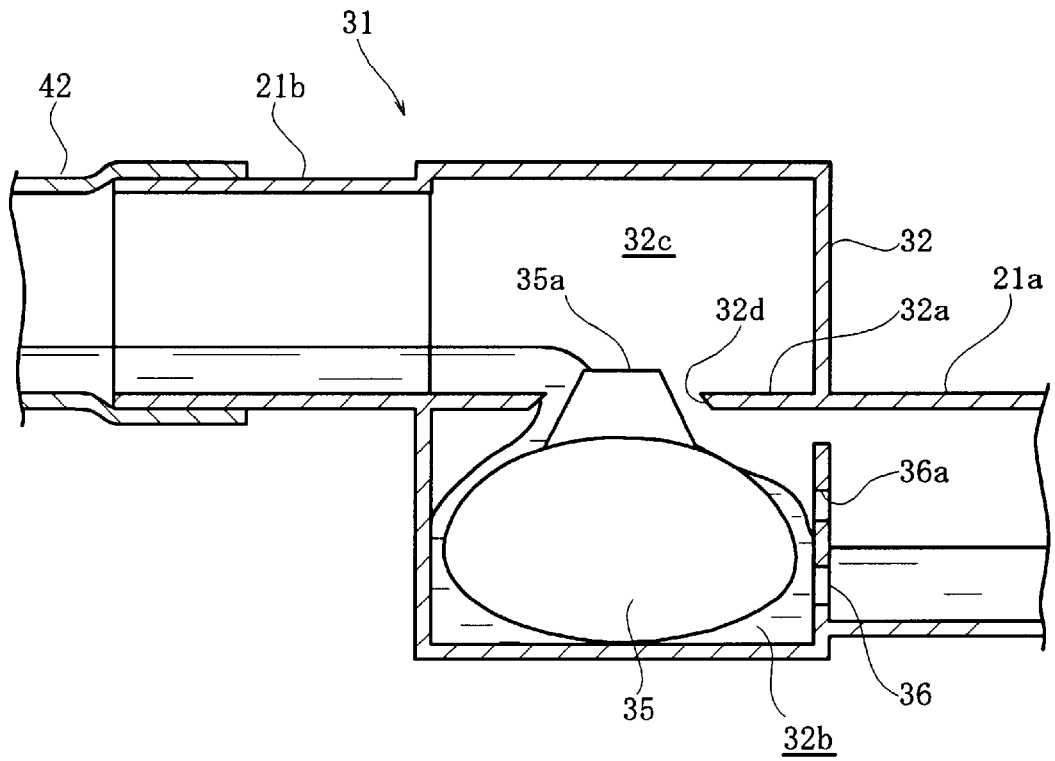
FIG. 3 is a cross-sectional view of the check valve allowing a flow of water.
Figure 4:
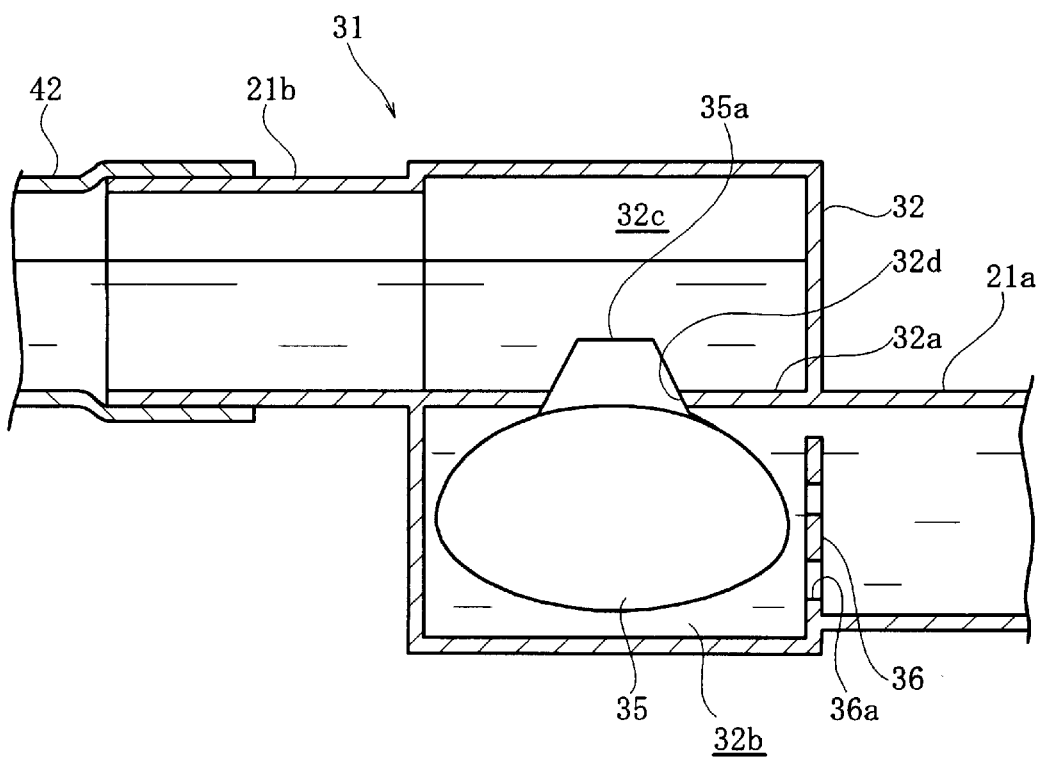
FIG. 4 is a cross-sectional view of the check valve inhibiting a flow of water.

Each intake pipe 21 has one end communicated with the interior of the water tank 11 through the side portion of water tank 11, and the other end opened to the underground around the water tank 11. In this embodiment, the intake pipes 21 are provided along the periphery of the water tank 11 (FIG. 1 shows intake pipes 21 provided at the opposite side faces, respectively). The one end of each intake pipe 21 is bondedly fixed to penetrate the waterproof sheet 13 of the water tank 11 so as to confront an end periphery of this one end with the interior of the water tank 11. Each intake pipe 21 is arranged near and above the water impermeable sheet 19, and attached with the check valve 31 at the intermediate portion of the intake pipe 21. As shown in FIGS. 3 and 4, the check valve 31 includes: a tubular case 32 divided into a first chamber 32b and a second chamber 32c by a partition 32a provided at the substantial center of the tubular case 32; and a float 35 housed within the first chamber 32b. Each intake pipe 21 is constituted of a downstream tubular portion 21a bondedly fixed to penetrate the waterproof sheet 13 and an upstream tubular portion 21b opened to the underground around the water tank 11. The downstream tubular portion 21a is provided at the side portion of the case 32 so as to communicate with the first chamber 32b. The upstream tubular portion 21b is provided at the upper side portion of the case 32 at a position symmetrical to the downstream tubular portion 21a so as to communicate with the second chamber 32c. Note, provided at the connecting portion of the downstream tubular portion 21a to the case 32 is a wall portion 36 formed with a plurality of holes 36a allowing rainwater to flow therethrough.

Formed at the center portion of the partition 32a is a circular opening 32d. The float 35 opposing to the circular opening 32d is formed with a truncated conical projecting portion 35a constituted to be insertable into the circular opening 32d to thereby close this opening. This float 35 is constituted to float on water. As shown in FIG. 3, the float 35 is constituted to sink within the first chamber 32b such that its projecting portion 35a departs from the circular opening 32d to thereby allow water to flow from the other end of the intake pipe 21 to the one end thereof, when the first chamber 32b housing the float 35 therein is not filled with rainwater or when the water pressure at the other end side of the intake pipe 21 is equal to or higher than that at the one end side of the intake pipe 21. Meanwhile, as shown in FIG. 4, the float 35 is constituted to float up within the first chamber 32b to close the circular opening 32d by the projecting portion 35a of the float 35 so as to prevent the water within the water tank 11 from flowing out by inhibiting the water from flowing into the intake pipe 21, when the first chamber 32b housing the float 35 therein is filled with water and the water pressure at the other end side of the intake pipe 21 becomes lower than the water pressure at the one end side of the intake pipe 21 where the water pressure at the other end side of the intake pipe 21 has lowered such as by evaporation of underground water or infiltration of underground water into the deeper underground.

Figure 2:
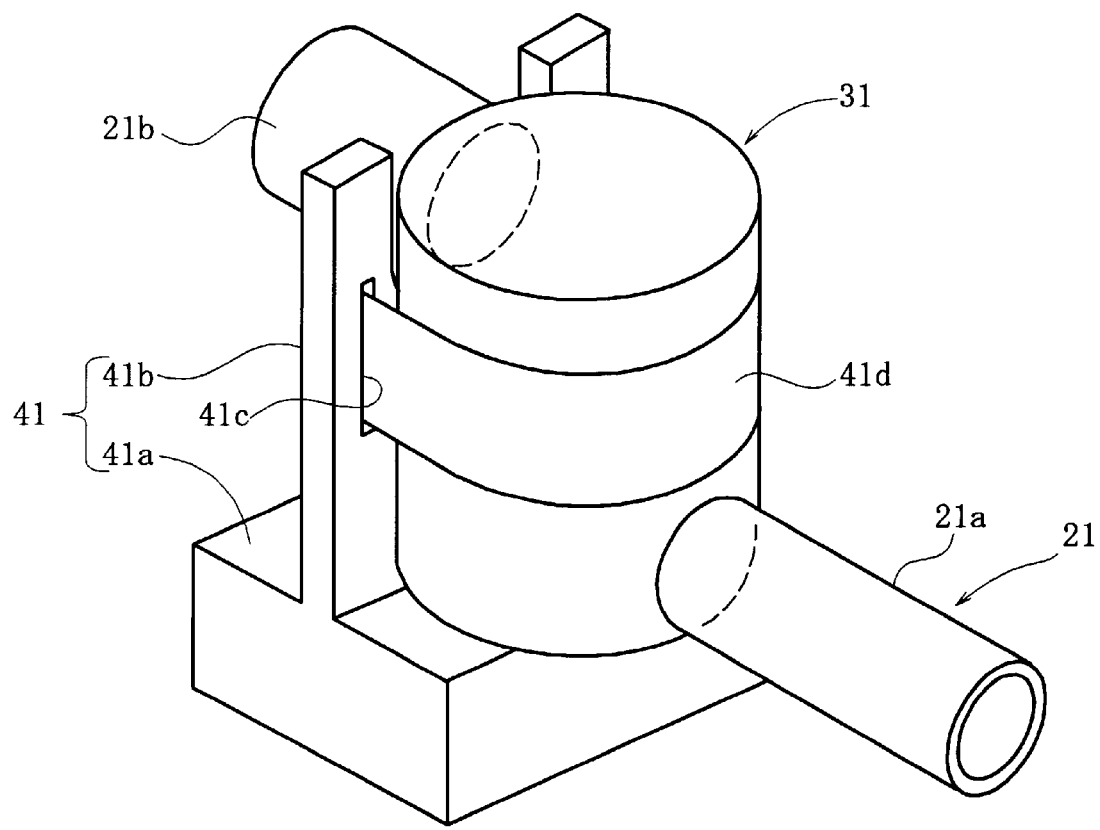
FIG. 2 is a perspective view showing a state where a check valve is attached to a mounting member.

As shown in FIG. 2, each check valve 31 is fixed to a mounting member 41, which is buried near the water tank 11. The mounting member 41 in this embodiment is formed of concrete, and has a base 41a formed with mounting portions 41b. Each mounting portion 41b is formed with an installation hole 41c into which a band 41d is inserted. The band 41d is fastened to the mounting portions 41b to thereby mount the check valve 31 to the mounting portion 41b.

Figure 5:
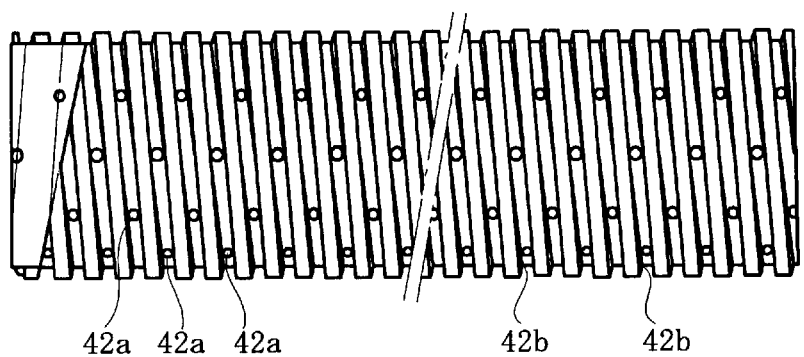
FIG. 5 is a side view of a perforated pipe.

As shown in FIG. 1, the other end of each intake pipe 21 provided at the side portion of the water tank 11 is attached with one end of a perforated pipe 42. As shown in FIG. 5, the perforated pipe 42 is formed with a spiral concave groove 42b therearound, and is formed to be bendable by virtue of the concave groove 42b. The concave groove 42b is formed with a plurality of water through-holes 42a. Turning to FIG. 1, the other end of each perforated pipe 42 is buried underground at a level higher than the other end of the associated intake pipe 21. In this embodiment, the other end of the perforated pipe 42 is buried at a level higher than the water tank 11 and near the ground surface. Each perforated pipe 42 is laid down in a linear fashion, while the perforated pipes 42 are radially buried from the water tank 11 viewed from the above. Notably, there is provided a gravel stratum 43 around each perforated pipe 42 upon burying each perforated pipe 42, so as to prevent clogging of the water through-holes 42a and collect rainwater as much as possible.

There will be described hereinafter a procedure for constructing the water tank 11 of the present invention.

Figure 6:
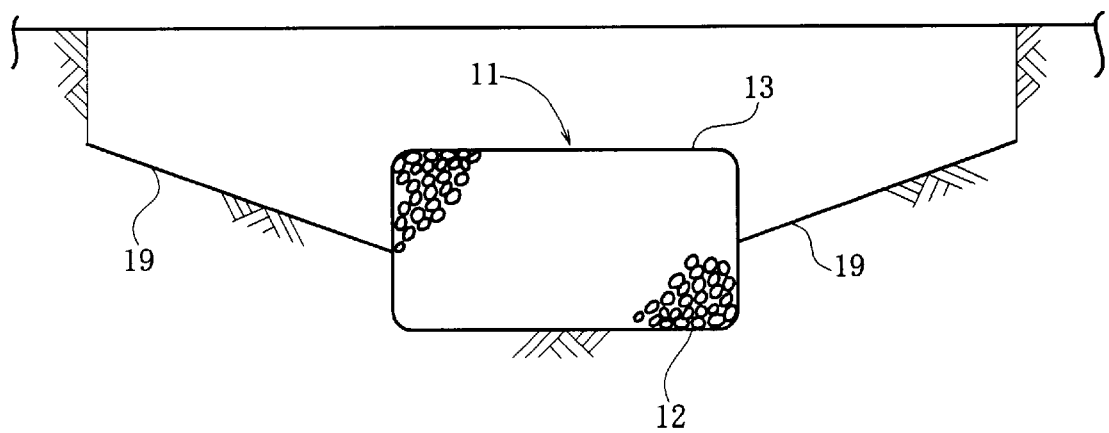
FIG. 6 is a cross-sectional view showing a state where a water impermeable sheet is laid down on the periphery of a water tank formed by digging.

Firstly, there is firstly dug a place where the water tank 11 is to be constructed, as shown in FIG. 6. This digging is conducted in accordance with the depth at which the water tank 11 is to be buried, as well as the size, depth and shape based on which the water impermeable sheet 19 is to be laid down. In this embodiment, the digging is formed into an earthenware mortar shape in accordance with the size, depth and shape based on which the water impermeable sheet 19 is to be laid down, after digging the place where the water tank 11 is to be buried. After digging, the water tank 11 is firstly formed at the central lowermost portion of the digging. The formation of the water tank 11 is conducted by firstly providing the waterproof sheet 13, then piling up the aquiferous materials 12 on the center portion of the waterproof sheet 13, and thereafter enclosing the aquiferous materials 12 by the outer periphery of the waterproof sheet 13. Namely, the water tank 11 is formed by standing up the outer periphery of the waterproof sheet 13 to thereby surround the aquiferous materials 12, and then placing the outermost periphery of the waterproof sheet 13 onto the upper surfaces of the aquiferous materials 12 to thereby enclose them.

The aquiferous materials 12 include sands, gravels, ragstones or plastic shaped bodies. Since the intake pipes 21 are to be attached to the waterproof sheet 13 in a later process, there are previously reserved spaces for mounting the intake pipes 21 upon piling up the aquiferous materials 12 in case of adopting, as the aquiferous materials 12, sands, gravels, rag-stones or plastic shaped bodies having relatively small mutual gaps therebetween. To reserve such spaces, sands, gravels, rag-stones or the like are piled up in a manner to reserve spaces. Alternatively, sands, gravels, rag-stones or shaped bodies are piled up while inserting separate members thereinto for reserving spaces. Contrary, in adopting, as the aquiferous materials 12, plastic shaped bodies having relatively large mutual gaps therebetween, no spaces are required to be particularly provided for mounting the intake pipes 21, insofar as the intake pipes 21 are insertable into such gaps. After forming the water tank 11, the water impermeable sheet 19 is laid down over the ground surface of the earthenware mortar shape dug around the water tank 11.

Figure 7:
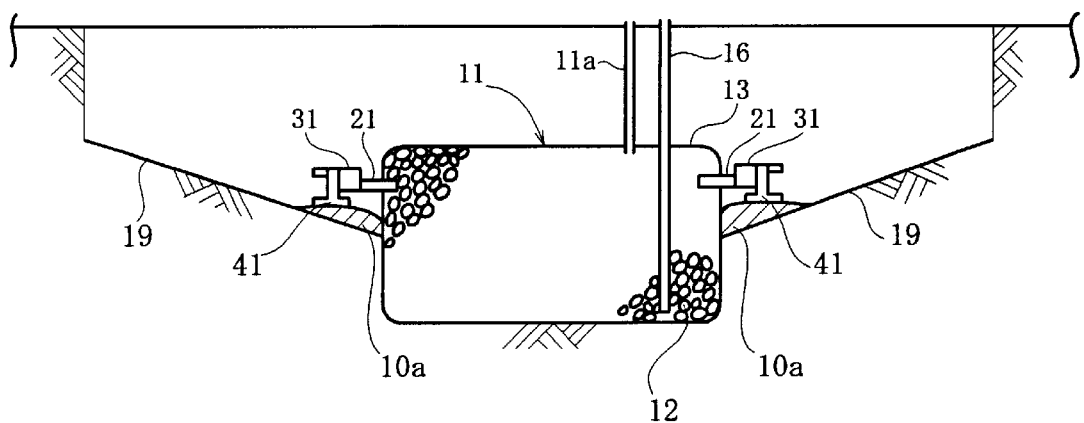
FIG. 7 is a cross-sectional view corresponding to FIG. 6, showing a state where intake pipes and check valves are attached to the water tank.

Thereafter, as shown in FIG. 7, one end of each intake pipe 21 previously attached with the check valve 31 is bondedly fixed to penetrate the waterproof sheet 13 at the side portion of the water tank 11, and the waterproof sheet 13 at the upper portion of the water tank 11 is bondedly fixed with the lower ends of the vent pipe 11a, overflow pipe (not shown) and drain pipe 16 by penetrating them through the waterproof sheet 13. In this case, each intake pipe 21 is arranged near and above the water impermeable sheet 19, and each mounting member 41 is arranged on the water impermeable sheet 19 near each intake pipe 21. When it is impossible to suitably attach each check valve 31 to each mounting member 41 by the simple arrangement of each mounting member 41 on the water impermeable sheet 19, there is applied an embankment 10a on the water impermeable sheet 19 and the mounting member 41 is arranged on the embankment 10a after positionally adjusting the height and inclination of the embankment for the mounting member 41. The suitably arranged mounting member 41 is attached with the check valve 31 by the band 41d.

Figure 8:
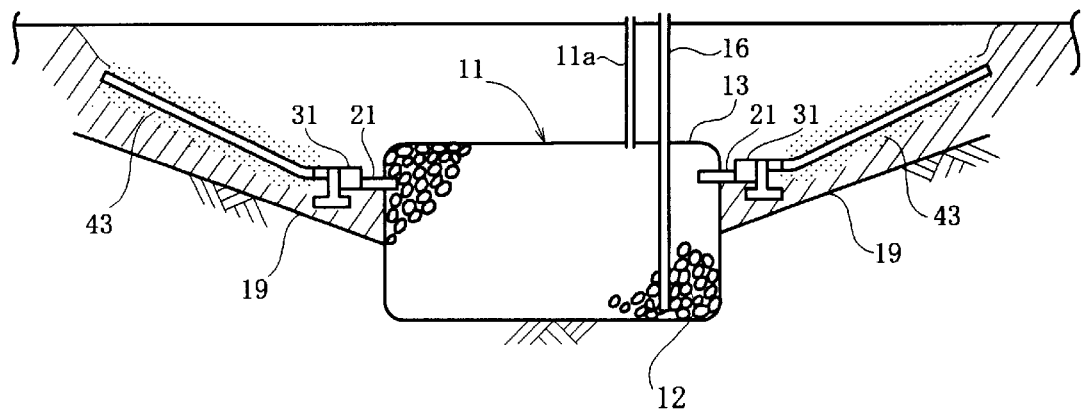
FIG. 8 is a cross-sectional view corresponding to FIG. 7, showing a state where perforated pipes are attached to the intake pipes via check valves.

After the attachment of each check valve 31, the digging is filled back, up to the vicinity of the upstream tubular portion 21b as shown by an area of slanted lines in FIG. 8. In this state, each perforated pipe 42 is connected to the other end of the associated intake pipe 21, by fitting one end of the perforated pipe 42 into the associated upstream tubular portion 21b. The digging around the water tank 11 is further filled back after the connection of the perforated pipe 42 by filling back gravels near the perforated pipe 42 such that the gravel stratum 43 is provided around the perforated pipe 42 after the filling back. Turning to FIG. 1, the drain pump 17 is connected to the upper end of the drain pipe 16 at the filled back ground surface. On the remaining ground surface, there is purposively built a house 51 or a factory, or purposively provided a parking space. In this embodiment, there is built the house 51, and an underground infiltration box 53 is buried near the house 51. The constitution is such that rainwater having fallen onto a roof 51a of the house 51 is guided by a gutter 52 to the underground infiltration box 53.

In the thus constituted wide area water collection type underground water tank, rainwater having fallen onto the ground surface infiltrates into the underground. In this case, rainwater having fallen onto the roof 51a of the house 51 passes through the gutter 52 and then infiltrates into the underground from the underground infiltration box 53. The rainwater having infiltrated into the underground is purified by the natural filtering effect of the ground. The water having infiltrated into and filtered by the underground near the perforated pipe 42 is guided via water through-holes 42a into the perforated pipe 42, and each perforated pipe 42 guides the thus guided rainwater to the other end of the associated intake pipe 21. Since the water pressure at the other end side of the intake pipe 21 is equal to or higher than that of the one end side of the intake pipe 21 under the condition that no rainwater is reserved within the water tank 11, each check valve 31 allows the water to flow from the other end to the one end of the intake pipe 21 so that the water tank 11 stores the filtered clean rainwater therein.

The water, which has infiltrated into the underground around the water tank 11 but has not been guided to each perforated pipe 42, reaches the water impermeable sheet 19 and flows toward the water tank 11 by the inclination of the water impermeable sheet 19. Since each intake pipe 21 is arranged above and near the water impermeable sheet 19, the water having flown toward the water tank 11 along the water impermeable sheet 19 is guided into the perforated pipe 42 via suitable water through-holes 42a and then flows into the water tank 11 via intake pipe 21 so as to be stored in the water tank 11. In this way, the water tank 11 reserves rainwater having fallen onto a relatively wide area and collected by the perforated pipes 42 and water impermeable sheet 19 spread over such an area.

Upon arrival of the rainwater stored in the water tank 11 at a predetermined water level, the water pressure at the other end side of the intake pipe 21 becomes lower than that of the one end side of the intake pipe 21 and each check valve 31 inhibits water from flowing back from the one end of the intake pipe 21 toward the other end thereof. Thus, the water once guided into and stored in the water tank 11 is never allowed to leak out from each intake pipe 21, and thus is effectively reserved within the water tank 11. As a result, the water within the water tank 11 never infiltrates into the underground or evaporates, even when the rainwater existing within the ground around the water tank 11 infiltrates down to the deeper underground via gaps, jointing portions and/or slits of the water impermeable sheet 19 or even when such rainwater evaporates by subsequent drought.

Figure 9:
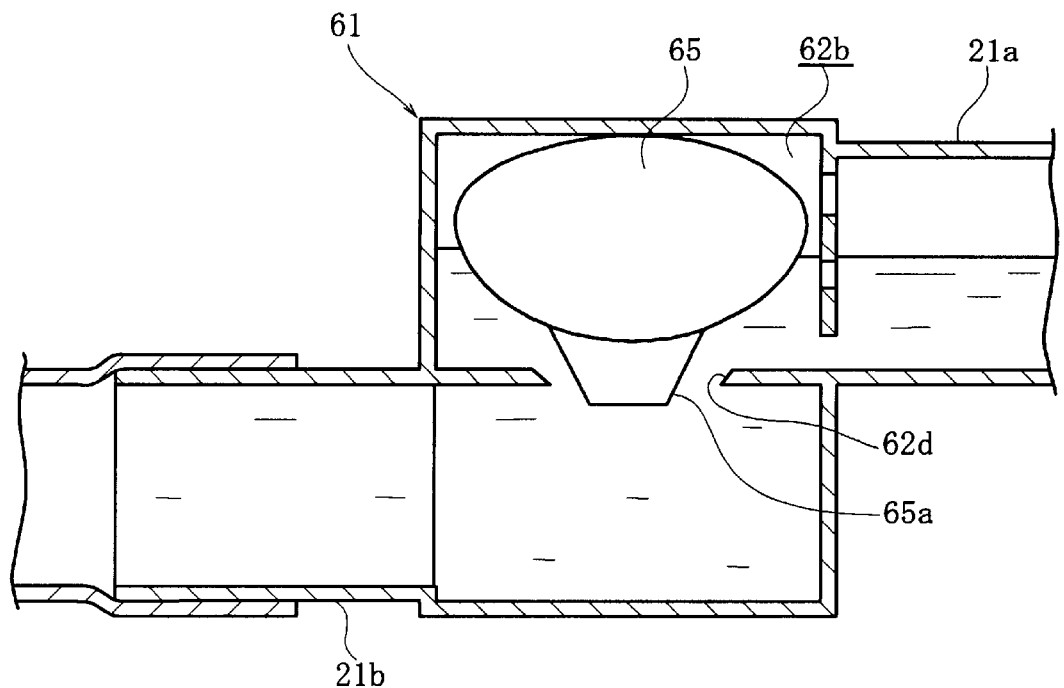
FIG. 9 is a cross-sectional view of an alternative check valve allowing a flow of water.
Figure 10:
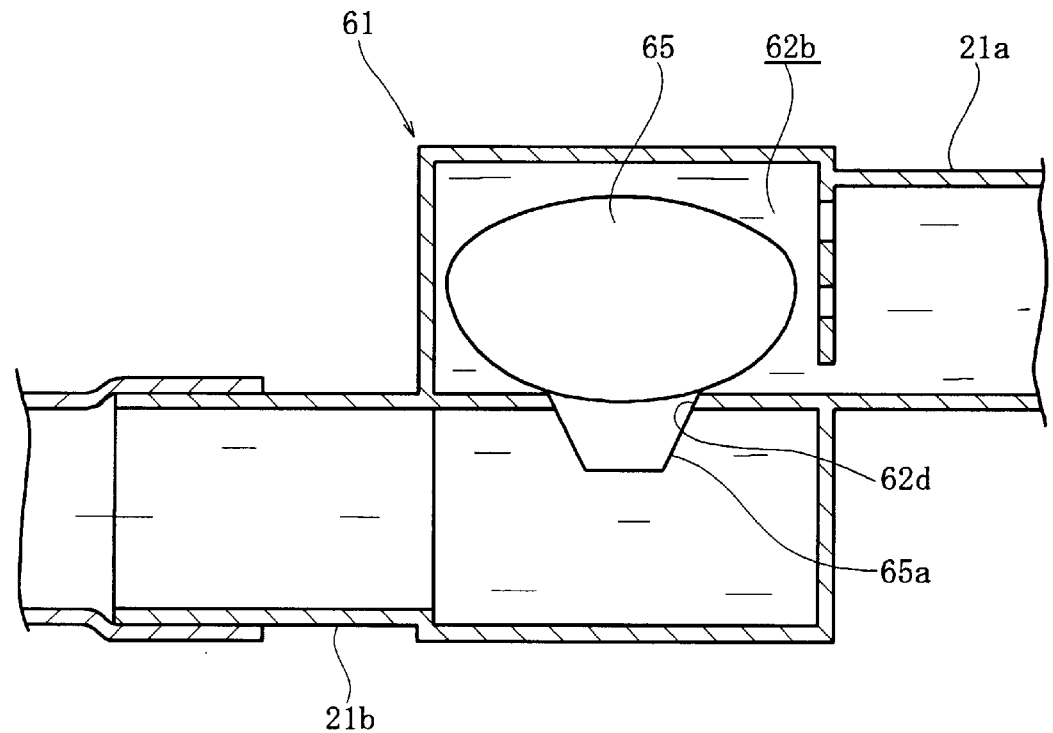
FIG. 10 is a cross-sectional view of the alternative check valve inhibiting a flow of water.

In the embodiment as described above, there has been adopted that float 35 of the check valve 31, which is floatable on water. However, as shown in FIGS. 9 and 10, it is also possible to adopt such a float 65 of a check valve 61, which is sinkable in water. In using the water sinkable float 65 as shown in FIG. 9, when a first chamber 62b housing the float 65 therein is not filled with water or when the water pressure at the other end side of the intake pipe 21 is equal to or higher than that at the one end side of the intake pipe 21 even if the first chamber 62b is filled with water, the float 65 is pushed up within the first chamber 62b by virtue of the difference between the water pressures to thereby bring a projecting portion 65a of the float 65 away from a circular opening 62d so as to allow water to flow from the other end of the intake pipe 21 to the one end thereof. Contrary, as shown in FIG. 10, when the first chamber 62b housing the float 65 therein is filled with water and the water pressure at the other end side of the intake pipe 21 becomes lower than that at the one end side of the intake pipe 21 where the water pressure at the other end side of the intake pipe 21 has lowered by evaporation of underground water or infiltration thereof into the deeper underground, the float 65 sinks within the first chamber 62b to close the circular opening 62d by the projecting portion 65a to thereby inhibit water from flowing through the intake pipe 21.

Figure 11:
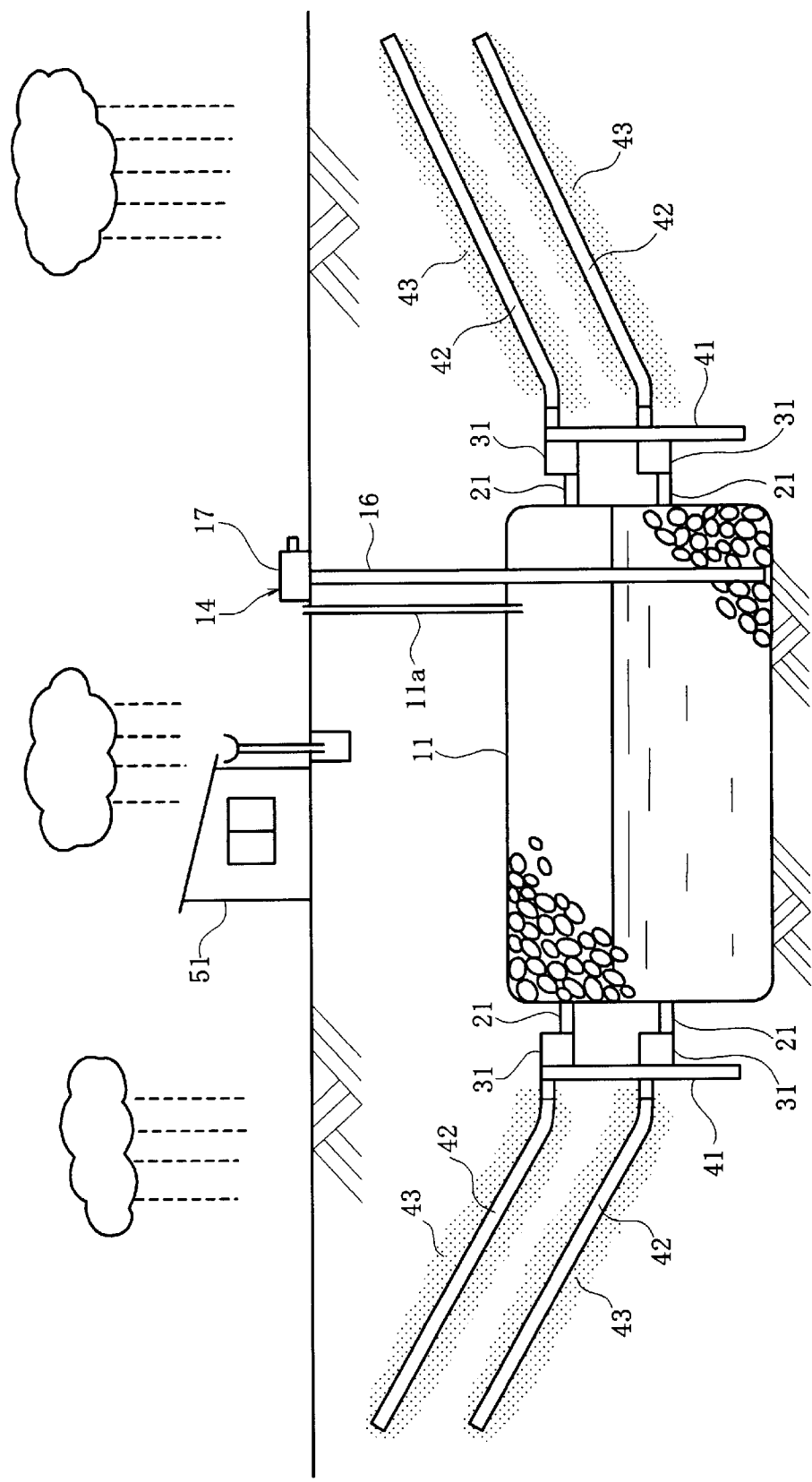
FIG. 11 is a schematic cross-sectional view of another wide area water collection type underground water tank according to the present invention.

Further, in the aforementioned embodiment, the water tank 11 has been buried in a ground such as sandy soil into which rainwater is easily apt to infiltrate, and the water impermeable sheet 19 has been buried and upwardly and outwardly inclined from the middle of the side of the water tank 11. However, when the ground is argillaceous one or red clay into which rainwater rarely infiltrates, it is preferable to provide a plurality of layers of intake pipes 21 in the vertical direction and provide a perforated pipe 42 for each intake pipe 21 as shown in FIG. 11. This is to effectively reserve water in the water tank 11, by providing the plurality of perforated pipes 42 to thereby collect the rainwater infiltrated into the relatively shallow portion of the ground.

Figure 12:
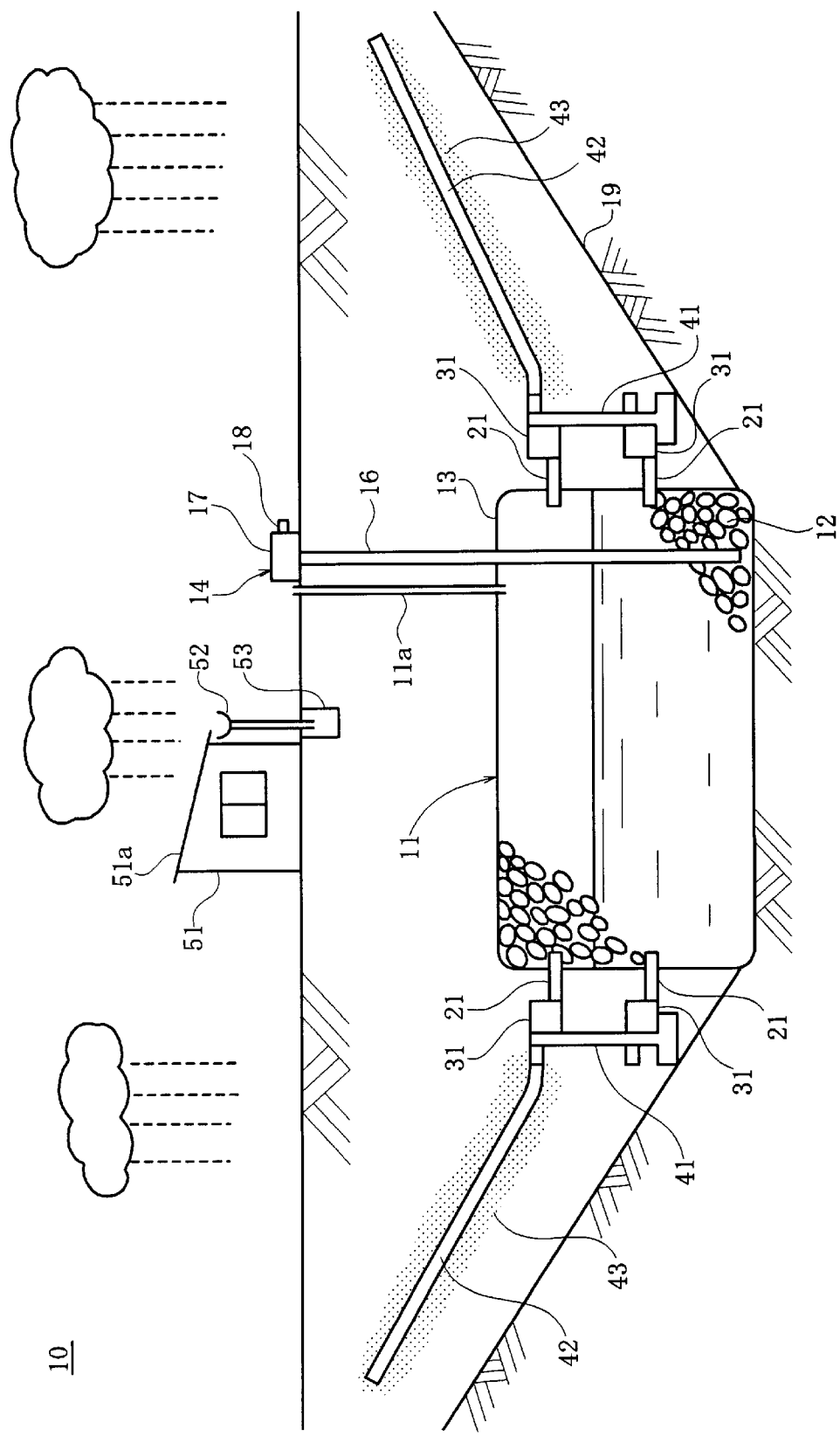
FIG. 12 is a schematic cross-sectional view of yet another wide area water collection type underground water tank according to the present invention.

Meanwhile, in burying the water tank 11 in a ground having a higher ratio of sands into which rainwater is particularly apt to infiltrate, it is preferable to provide a plurality of layers of intake pipes 21 as shown in FIG. 12 and to bury the water impermeable sheet 19 which is upwardly and outwardly inclined from the bottom of the water tank 11. In such a ground into which rainwater is particularly apt to infiltrate, the ratio of water to be guided into the perforated pipe 42 is reduced due to the relatively fast infiltration speed. However, by burying the water impermeable sheet 19 down to the bottom portion of the water tank 11, it becomes possible to bring the water infiltrated down to the vicinity of the water tank 11 and the water collected by the water impermeable sheet 19 into the water tank 11 via intake pipes 21 provided at the lower pipe layer, to thereby allow the water tank 11 to effectively collect and store rainwater having fallen over a relatively wide area.

In the aforementioned embodiment, the water tank 11 has been formed by enclosing aquiferous materials 12 by the waterproof sheet 13. However, it is possible to adopt a water tank (not shown) made of concrete. In such a water tank made of concrete constituted to reserve rainwater therein, it is unnecessary to provide aquiferous materials in the tank so that the work job can be simplified upon burying the water tank.

Further, in the aforementioned embodiment, the water impermeable sheet 19 has been laid down onto the ground surface dug in the earthenware mortar shape, along the whole periphery of the water tank 11 to enclose it. However, it is also possible to provide the water impermeable sheet around a part of the water tank 11 where water infiltration is particularly rapid. In this situation, the burying place can be narrowed without largely deteriorating the water collecting effect of the water impermeable sheet, thereby mitigating the digging operation.

In the aforementioned embodiment, the one end of each intake pipe 21 has been bondedly fixed to penetrate the waterproof sheet 13 at the side of the water tank 11, after forming the water tank 11. However, it is also possible to form a water tank 11 by enclosing aquiferous materials 12 by a waterproof sheet 13 bondedly fixed with intake pipes 21 in advance.

Figure 13:
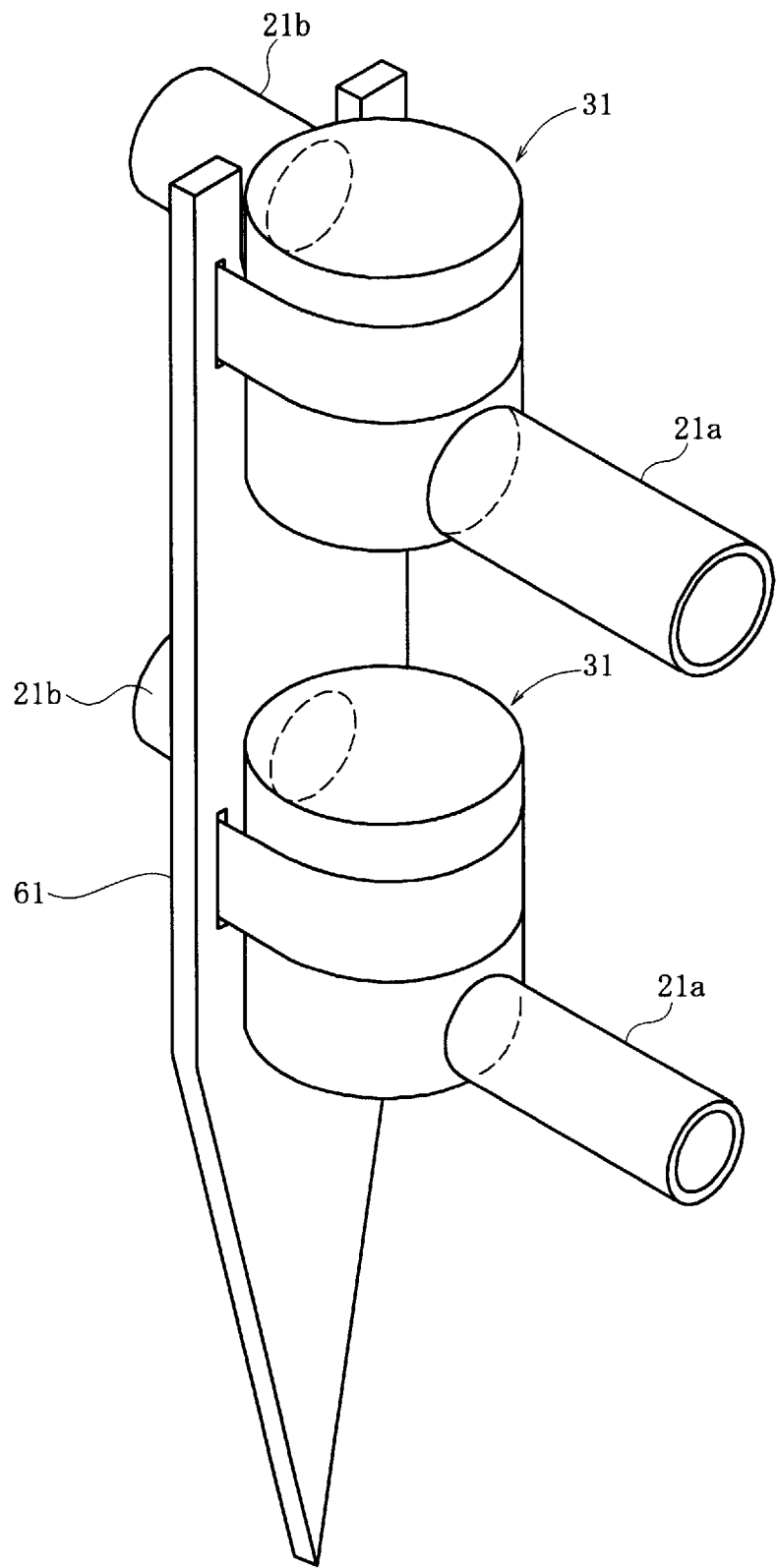
FIG. 13 is a perspective view showing a state where check valves are attached to another mounting member.

Moreover, in the aforementioned embodiment, there have been used mounting members 41 each formed with the base 41a at the bottom of the mounting portions 41b. However, as shown in FIG. 13, it is possible to use a mounting member 63 having a tapered lower end. This is particularly useful in providing a plurality of intake pipes 21. In such a mounting member 63 having a tapered lower end, it is possible to drive the mounting member 63 into the ground such as by a hammer and to fix check valves 31 to the mounting member 63 driven into and fixed in the ground, to thereby conduct the attachment of a plurality of check valves 31 having directivity at once and assuredly.

There will be hereinafter described another embodiment of the present invention, with reference to FIGS. 14 through 16. This embodiment is a wide area water collection type underground water tank provided with forcible check valve opening means 70, and like reference numerals as used in the above are used to denote corresponding or identical elements in FIGS. 14 through 16 to avoid their otherwise redundant description.

Figure 14:
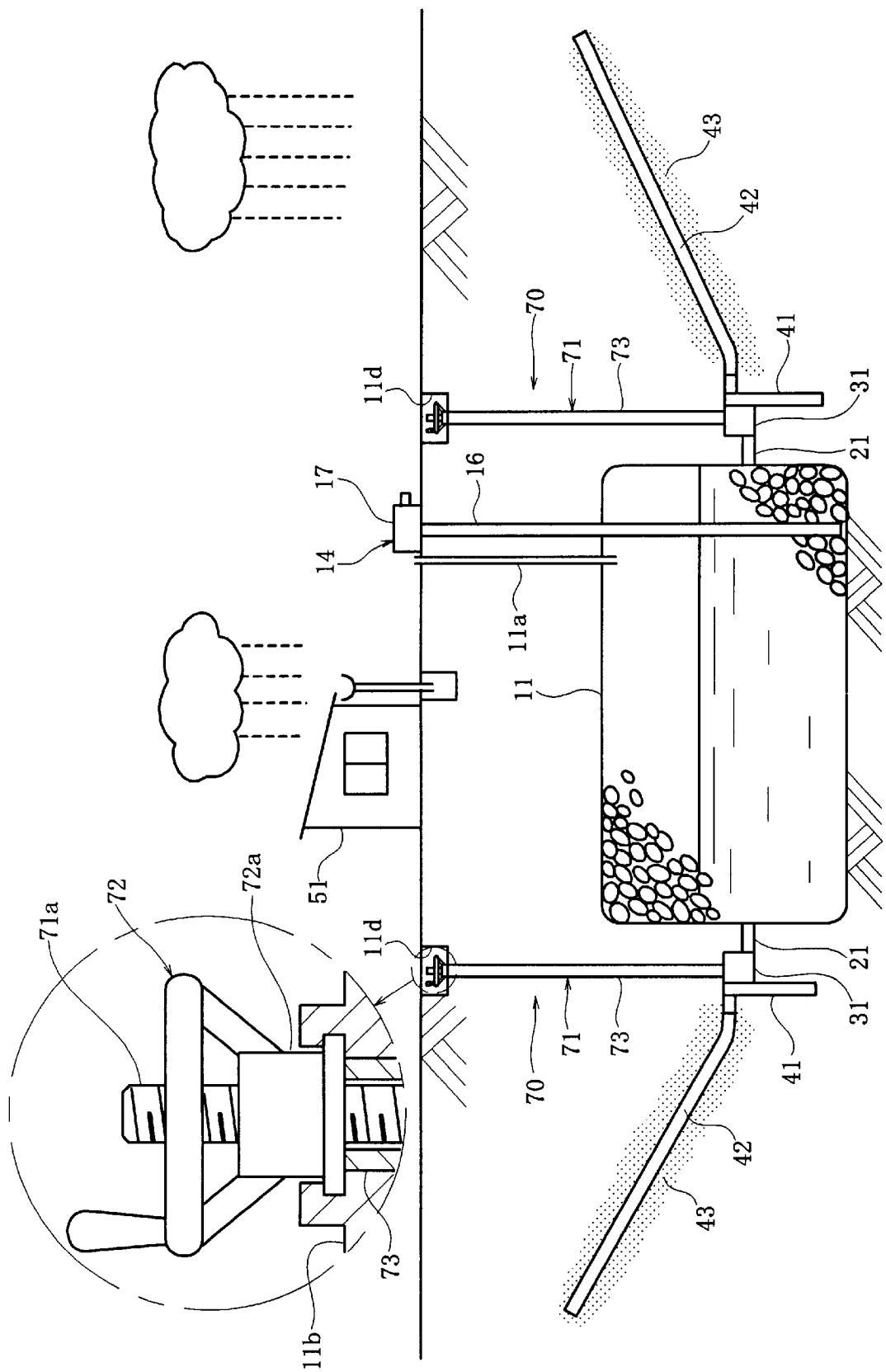
FIG. 14 is a schematic cross-sectional view of a wide area water collection type underground water tank provided with forcible check valve opening means according to the present invention.

In this embodiment as shown in FIG. 14, each intake pipe 21 is provided at a substantially intermediate portion at the side of the water tank 11 in the vertical direction, and is provided with an associated perforated pipe 42. There is adopted a water floatable float 35 (FIG. 15) as the check valve 31, and no water impermeable sheets are provided. The wide area water collection type underground water tank of this embodiment is provided with the forcible check valve opening means 70, and each forcible check valve opening means 70 includes a float driving rod 71 and an operation handle 72. The float driving rod 71 is provided in the vertical direction to expose its upper end above the ground surface and bring its lower end down to the check valve 31. The float driving rod 71 is provided unrotatably and vertically movably by inserting this rod 71 into a vertically buried protection tube 73, and includes an upper portion formed with a male screw 71a therearound. The operation handle 72 is fixed with a female screw member 72a threadedly fitted over the male screw 71a formed at the float driving rod 71. The operation handle 72 is provided in a concave part 11d formed at the aboveground position in a rotatable and vertically immovable manner. The constitution is such that rotation of the operation handle 72, in a state where the female screw member 72a and male screw 71a are mutually threaded, results in rotation of the female screw member 72a to thereby vertically move the unrotatably provided driving rod.

Figure 15:
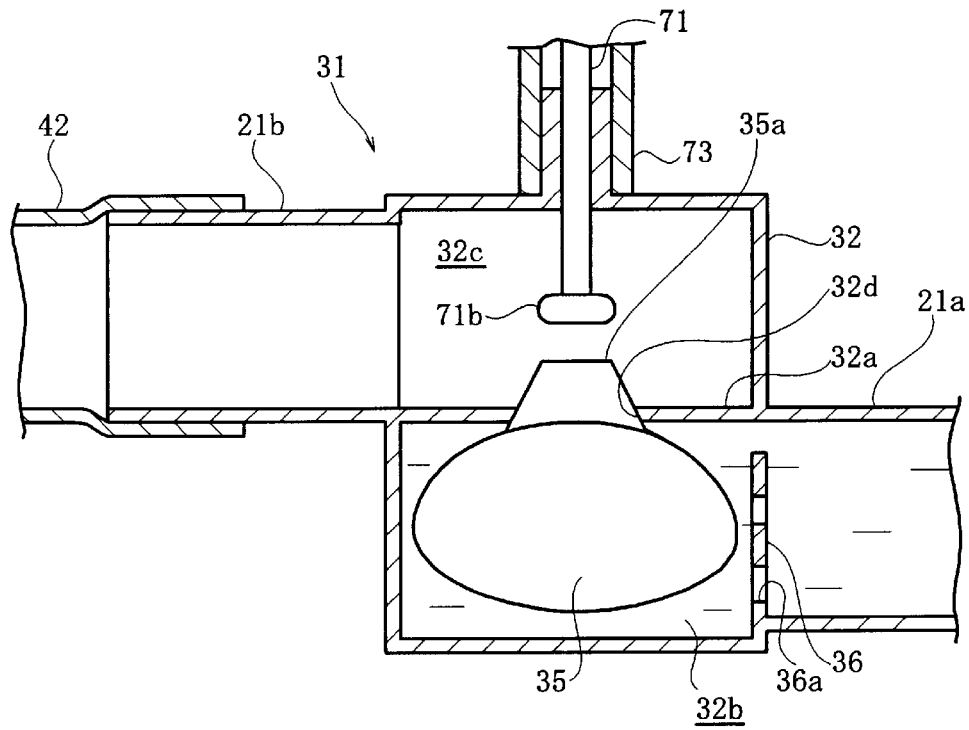
FIG. 15 is a cross-sectional view of a check valve provided with the forcible check valve opening means.

As shown in FIG. 15, the lower portion of the float driving rod 71 has a lower end watertightly penetrating the upper portion of the case 32 of the check valve 31 to thereby reach the interior of the second chamber 32c such that the lower end periphery of the lower end opposes to the projecting portion 35a of the float 35. The lower end of the float driving rod 71 is formed with a large diameter portion 71b. When the first chamber 32b housing the float 35 therein is filled with water and the water pressure at the other end side of the intake pipe 21 becomes lower than that at the one end side of the intake pipe 21 in a state where the float driving rod 71 has been moved upwardly as shown in the figure, the float 35 floats up within the first chamber 32b so as to inhibit water from flowing from the one end of the intake pipe 21 toward the other end of the intake pipe 21, thereby preventing outflow of the water within the water tank 11. Meanwhile, downward movement of the float driving rod 71 as shown by arrows in FIG. 16 firstly brings about abutment of the large diameter portion 71b at the lower end of the float driving rod 71 onto the upper surface of the projecting portion 35a of the float 35. Further downward movement of the float driving rod 71 in the state of the abutment of the large diameter portion 71b forces the float 35 to sink within the first chamber 32b so that the projecting portion 35a departs from the circular opening 32d. The constitution is such that, by virtue of the departure of the projecting portion 35a from the circular opening 32d, the forcible check valve opening means 70 allows water to flow from the one end of the intake pipe 21 toward the other end of the intake pipe 21 even when the water pressure at the other end side of the intake pipe 21 is lower than that at the one end side of the intake pipe 21.

In a state where the float driving rod 71 is moved upwardly in the thus constituted wide area water collection type underground water tank as shown in FIG. 15, the water infiltrated into the underground is guided into each perforated pipe 42, and the perforated pipe 42 guides the thus guided rainwater up to the other end of the intake pipe 21. When the water pressure at the other end side of the intake pipe 21 is equal to or higher than that at the one end side of the intake pipe 21, the check valve 31 allows the water to flow from the other end of the intake pipe 21 toward the one end of the intake pipe 21, and the water tank 11 stores the water. When the rainwater stored in the water tank 11 reaches a predetermined water level so that the water pressure at the other end side of the intake pipe 21 becomes lower than that of the one end side of the intake pipe 21, water is inhibited from flowing into the intake pipe 21, thereby effectively reserving water in the water tank 11.

Figure 16:
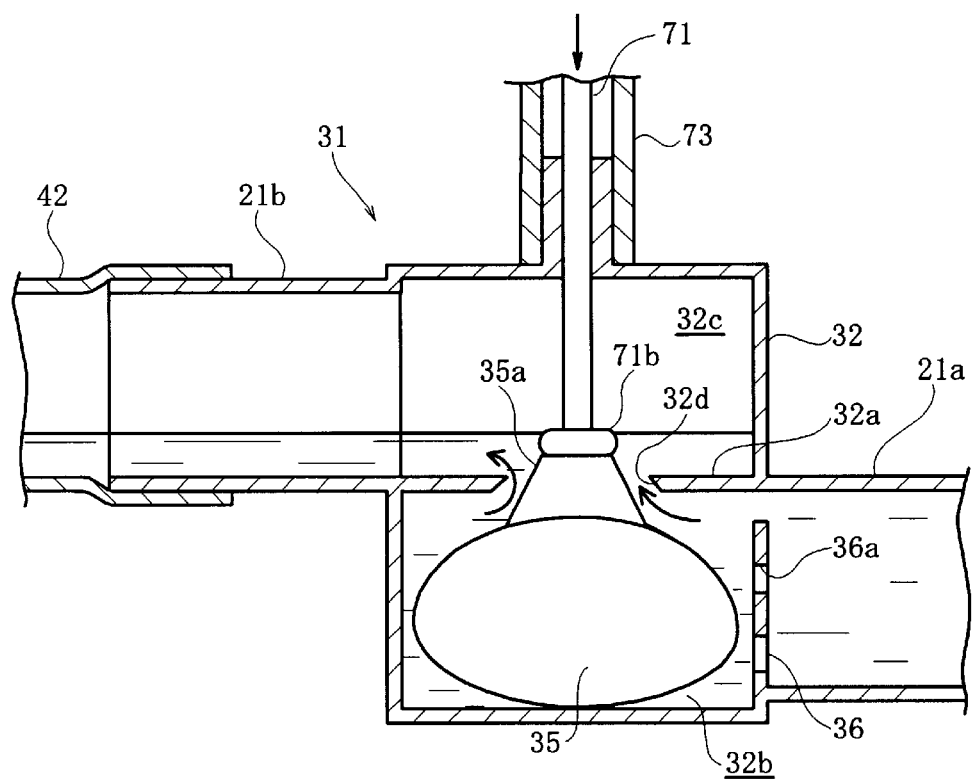
FIG. 16 is a cross-sectional view of the check valve forcibly opened by the forcible check valve opening means.

Contrary, when the float driving rod 71 is downwardly moved by rotating the operation handle 72 as shown in FIG. 16, the float 35 is pushed by the float driving rod 71 to sink within the first chamber 32b to render the projecting portion 35a depart from the circular opening 32d, thereby allowing a water flow from the other end of the intake pipe 21 toward the one end and vice versa. Thus, when the water pressure at the other end side of the intake pipe 21 becomes lower than that of the one end side of the intake pipe 21 since the water existing within the ground around the water tank 11 evaporates or infiltrates into the deeper underground upon subsequent fine weather, the water reserved within the water tank 11 flows from the one end of the intake pipe 21 toward the other end of the intake pipe 21 and then leaks out of the water through-holes 42a of the perforated pipe 42 into the ground around the water tank 11, to thereby again form a space within the water tank 11 for reserving rainwater. Thus, by controlling the check valve 31 by the forcible check valve opening means 70 so as to allow water to flow from the one end of the intake pipe 21 toward the other end, it becomes possible to constantly prepare a space capable of temporarily reserving a constant amount of rainwater infiltrating into the underground upon rainfall.

Figure 17:
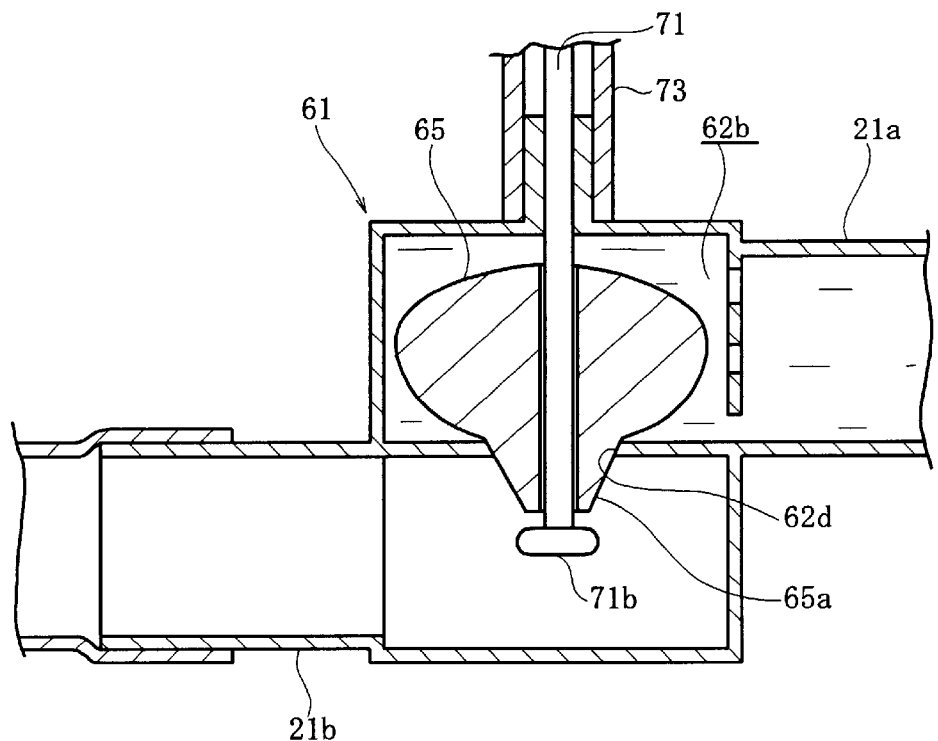
FIG. 17 is a cross-sectional view of an alternative check valve provided with forcible check valve opening means.
Figure 18:
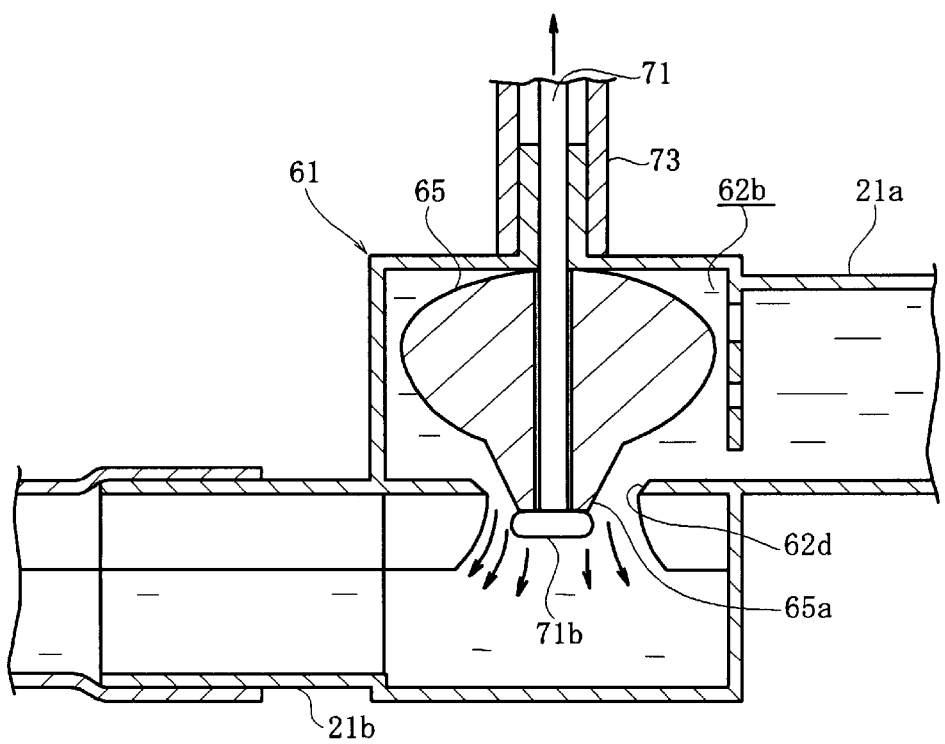
FIG. 18 is a cross-sectional view of the alternative check valve forcibly opened by the forcible check valve opening means.

In the aforementioned embodiment, there has been adopted the floatable float 35 for the check valve 31. However, the float 65 of the check valve 61 may be sinkable as shown in FIGS. 17 and 18. In using the water sinkable float 65, the lower portion of the float driving rod 71 is provided to penetrate the float 65, and the lower end of the float driving rod 71 positioned below the float 65 is formed with the large diameter portion 71b abutting onto the lower surface of the projecting portion 65a. In a state where the float driving rod 71 is downwardly moved in the thus formed float 65 as shown in FIG. 17, the float 65 sinks within the first chamber 62b when the first chamber 62b housing the float 65 therein is filled with water so that the water pressure at the other end side of the intake pipe 21 becomes lower than that at the one end side of the intake pipe 21, so as to inhibit the water from flowing into the intake pipe 21 to thereby prevent outflow of the water within the water tank 11. Meanwhile, upward movement of the float driving rod 71 as shown by arrows in FIG. 18 firstly brings about abutment of the large diameter portion 71b of the float driving rod 71 onto the lower surface of the projecting portion 65a of the float 65. Further upward movement of the float driving rod 71 in the state of the abutment of the large diameter portion 71b forces the float 65 to float up within the first chamber 62b so that the projecting portion 65a departs from the circular opening 62d. By virtue of the departure of the projecting portion 65a from the circular opening 62d, the forcible check valve opening means 70 allows water to flow from the one end of the intake pipe 21 toward the other end of the intake pipe 21 even when the water pressure at the other end side of the intake pipe 21 is lower than that at the one end side of the intake pipe 21.

The alternative embodiment has been described by adopting the forcible check valve opening means 70 provided with the float driving rod 71 and the operation handle 72. However, it is possible to adopt a driving mechanism such as a hydraulic cylinder or electric motor as the forcible check valve opening means 70, insofar as the mechanism is capable of controlling the check valve 31 such that water is allowed to flow from the one end of the intake pipe 21 toward the other end even when the water pressure at the other end side of the intake pipe 21 is lower than that at the one end side of the intake pipe 21. Although not shown, for example, it is constitutionally possible to provide a hydraulic cylinder or electric motor at the check valve so as to forcibly sink or float the float, to provide a hydraulic driving device or a power supply device on the ground surface so as to drive the hydraulic cylinder or the electric motor, and to drive the hydraulic cylinder or electric motor by the hydraulic driving device or the power supply device, to thereby control the check valve 31.

According to the present invention as described above, there are provided: a water tank buried underground; an intake pipe having one end communicated with the interior of the water tank and the other end opened to the underground around the water tank; a check valve attached to the intake pipe; and a water impermeable sheet which is buried underground and upwardly and outwardly inclined from the side or bottom of the water tank. Thus, the water infiltrated into the underground and naturally purified by the ground and guided by the water impermeable sheet is taken into the water tank via intake pipe, so that the underground water tank reserves only the clean rainwater having fallen over a relatively wide area and then filtered by the ground. Once the water tank has stored water, the check valve prevents water from leaking via intake pipe, even when the rainwater existing within the ground around the water tank infiltrates down to the deeper underground via gaps, jointing portions and/or slits of the water impermeable sheet or even when such rainwater evaporates by subsequent drought. Thus, rainwater is effectively reserved in the water tank. As a result, it becomes possible to reserve relatively clean infiltrating/filtered rainwater, to thereby reduce the burden of management of the water tank itself.

Further, by burying the perforated pipe underground such that its one end of the perforated pipe is connected to the other end of the intake pipe and the other end of the perforated pipe is positioned at the upper level, the perforated pipe guides the water having infiltrated to the vicinity of the perforated pipe toward the other end of the intake pipe. By providing a gravel stratum around the perforated pipe, this gravel stratum prevents clogging of water through-holes due to soil and sand. By fixing the check valve to the mounting member buried near the water tank, the mounting of the check valve can be assuredly conducted even when the check valve has directivity.

In the present invention, there can be envisaged the following usage, based on the aforementioned effects. Namely, even when relatively clean water becomes insufficient such as in a country or district where filtering devices are not well prepared, it is possible to transport relatively dirty water such as in neighboring rivers, ponds or swamps by transporting means such as a tank truck so as to sprinkle the water onto the ground surface under which the water tank is buried, such that the dirty water is filtered by the ground into relatively clean water and the filtered clean water can be reserved.

Meanwhile, by providing the forcible check valve opening means for controlling the check valve to allow water to flow from the one end of the intake pipe toward the other end of the intake pipe even when the water pressure at the other end side of the intake pipe is lower than the water pressure at the one end side of the intake pipe, it becomes possible to constantly prepare a space capable of temporarily reserving a constant amount of rainwater infiltrating into the underground upon rainfall by controlling the check valve by the forcible check valve opening means so as to allow water to flow from the one end of the intake pipe toward the other end of the intake pipe. As a result, it becomes possible to prevent the underground from being saturated by the rainwater infiltrating thereinto by temporarily reserving a constant amount of rainwater, even upon a relatively much amount of rainfall, to thereby prevent an occurrence of a so-called flood in which the rainwater infiltrating into the underground is saturated so that rainwater is forced to flow on the ground surface. Notably, it is possible to allow water to flow from the one end of the intake pipe toward the other end of the intake pipe, when the forcible check valve opening means is provided with the vertically arranged driving rod and the operation handle arranged on the ground surface such that the check valve can be controlled by a relatively simple operation only to vertically move the float driving rod by rotating the operation handle.

INDUSTRIAL APPLICABILITY

The wide area water collection type underground water tank of the present invention is capable of collecting and reserving rainwater having fallen onto a roof or rooftop of a house or onto a ground surface over a relatively wide area and then infiltrated into the underground and filtered by the ground.

What is claimed is:

1. A wide area water collection underground water tank comprising:
   a water tank (11) constituted to be capable of reserving water therein, said water tank (11) being buried underground and having draining means (14) capable of drawing out the water within said water tank (11) from the aboveground position;
   one or two or more intake pipe (21) having one end communicated with the interior of said water tank (11) from the side portion or upper portion of said water tank (11), and the other end opened into the underground around said water tank (11);
   a check valve (31) mounted to said intake pipe (21), said check valve (31) being constituted to: allow water to flow from the other end of said intake pipe (21) toward the one end of said intake pipe (21) when the water pressure at the other end side of said intake pipe (21) is equal to or higher than that at the one end side of said intake pipe (21); and inhibit water from flowing from the one end of said intake pipe (21) toward the other end of said intake pipe (21) when the water pressure at the other end side of said intake pipe (21) is lower than that at the one end side of said intake pipe (21); and
   a water impermeable sheet (19) buried underground and being upwardly and outwardly inclined from the side or bottom of said water tank (11);
   wherein the other end of said intake pipe (21) is arranged above said water impermeable sheet (19).

2. A wide area water collection underground water tank of claim 1, further comprising:
   a perforated pipe (42) buried underground and formed with a plurality of water through-holes (42a) at the periphery of said perforated pipe (42),
   wherein said perforated pipe (42) includes: one end connected to the other end of said intake pipe (21); and the other end buried in the underground at a level higher than the other end of said intake pipe (21).

3. A wide area water collection underground water tank of claim 2,
   wherein a gravel stratum (43) is provided around said perforated pipe (42).

4. A wide area water collection underground water tank of claim 1, further comprising a mounting member (41), wherein said check valve (31) is fixed to said mounting member (41).

5. A wide area water collection underground water tank of claim 2, further comprising a mounting member (41), wherein said check valve (31) is fixed to said mounting member (41).

6. A wide area water collection underground water tank of claim 3, further comprising a mounting member (41), wherein said check valve (31) is fixed to said mounting member (41).

7. A wide area water collection underground water tank comprising:
   a water tank (11) constituted to be capable of reserving water therein, said water tank (11) being buried underground and having draining means (14) capable of drawing out the water within said water tank (11) from the aboveground position;
   one or two or more intake pipe (21) having one end communicated with the interior of said water tank (11) from the side portion or upper portion of said water tank (11), and the other end opened into the underground around said water tank (11);
   a check valve (31) mounted to said intake pipe (21), said check valve (31) being constituted to: allow water to flow from the other end of said intake pipe (21) toward the one end of said intake pipe (21) when the water pressure at the other end side of said intake pipe (21) is equal to or higher than that at the one end side of said intake pipe (21); and inhibit water from flowing from the one end of said intake pipe (21) toward the other end of said intake pipe (21) when the water pressure at the other end side of said intake pipe (21) is lower than that at the one end side of said intake pipe (21); and
   forcible check valve opening means (70) for controlling said check valve (31) so as to allow water to flow from the one end of said intake pipe (21) toward the other end of said intake pipe (21) even when the water pressure at the other end side of said intake pipe (21) is lower than that at the one end side of said intake pipe (21).

8. A wide area water collection underground water tank of claims 7,
   wherein said forcible check valve opening means (70) comprises: a float driving rod (71) provided vertically to reach a float (35) of said check valve (31) from the aboveground position; and an operation handle (72) arranged at the aboveground position and provided at the upper end of said float driving rod (71).

9. A wide area water collection underground water tank of claim 7, further comprising:
   a perforated pipe (42) buried underground and formed with a plurality of water through-holes (42a) at the periphery of said perforated pipe (42),
   wherein said perforated pipe (42) includes: one end connected to the other end of said intake pipe (21); and the other end buried in the underground at a level higher than the other end of said intake pipe (21).

10. A wide area water collection underground water tank of claim 8, further comprising:
    a perforated pipe (42) buried underground and formed with a plurality of water through-holes (42a) at the periphery of said perforated pipe (42),
    wherein said perforated pipe (42) includes: one end connected to the other end of said intake pipe (21); and the other end buried in the underground at a level higher than the other end of said intake pipe (21).

11. A wide area water collection underground water tank of claim 9,
    wherein a gravel stratum (43) is provided around said perforated pipe (42).

12. A wide area water collection underground water tank of claim 10,
    wherein a gravel stratum (43) is provided around said perforated pipe (42).

13. A wide area water collection underground water tank of claim 7, further comprising a mounting member (41), wherein said check valve (31) is fixed to said mounting member (41).

14. A wide area water collection underground water tank of claim 8, further comprising a mounting member (41), wherein said check valve (31) is fixed to said mounting member (41).

15. A wide area water collection underground water tank of claim 9, further comprising a mounting member (41), wherein said check valve (31) is fixed to said mounting member (41).

16. A wide area water collection underground water tank of claim 10, further comprising a mounting member (41), wherein said check valve (31) is fixed to said mounting member (41).

17. A wide area water collection underground water tank of claim 11, further comprising a mounting member (41), wherein said check valve (31) is fixed to said mounting member (41).

18. A wide area water collection underground water tank of claim 12, further comprising a mounting member (41), wherein said check valve (31) is fixed to said mounting member (41).

* * * * *